United States Patent
Nishiyama

(10) Patent No.: US 12,160,478 B2
(45) Date of Patent: Dec. 3, 2024

(54) DEVICE MANAGEMENT SYSTEM

(71) Applicant: KYOCERA Document Solutions Inc., Osaka (JP)

(72) Inventor: Hisakazu Nishiyama, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 0 days.

(21) Appl. No.: 18/469,435

(22) Filed: Sep. 18, 2023

(65) Prior Publication Data

US 2024/0098150 A1   Mar. 21, 2024

(30) Foreign Application Priority Data

Sep. 20, 2022 (JP) ................. 2022-149014

(51) Int. Cl.
*H04L 67/142* (2022.01)
*G06F 9/54* (2006.01)
*H04L 67/141* (2022.01)

(52) U.S. Cl.
CPC ............ *H04L 67/142* (2013.01); *G06F 9/547* (2013.01); *H04L 67/141* (2013.01)

(58) Field of Classification Search
CPC . H04L 67/142; H04L 67/141; H04L 63/0281; G06F 9/547
USPC ....................................................... 709/227
See application file for complete search history.

(56) References Cited

U.S. PATENT DOCUMENTS

| | | |
|---|---|---|
| 2004/0184066 A1 | 9/2004 | Urabe |
| 2013/0227004 A1* | 8/2013 | Scoda ................. H04L 65/1045 709/203 |
| 2015/0256508 A1* | 9/2015 | Townsend ........... H04L 63/0884 709/245 |
| 2018/0041589 A1* | 2/2018 | Bolger .................. G06F 16/955 |
| 2019/0014088 A1* | 1/2019 | Subramaniyan .... H04L 63/0281 |
| 2020/0128085 A1* | 4/2020 | Khait .................... H04L 67/142 |
| 2020/0351243 A1* | 11/2020 | Lu ........................... H04L 67/60 |
| 2021/0194847 A1* | 6/2021 | Gu ........................... H04L 67/12 |
| 2022/0191193 A1* | 6/2022 | Hamilton .............. H04L 63/029 |

FOREIGN PATENT DOCUMENTS

JP    4638131 B2    2/2011

* cited by examiner

*Primary Examiner* — Ruolei Zong
(74) *Attorney, Agent, or Firm* — Alleman Hall & Tuttle LLP

(57) ABSTRACT

A device management system includes a frontend and a backend. The frontend includes a first domain. The backend includes a domain of a relay system as a relay backend domain that is a domain of the backend. The frontend accesses the relay backend domain when an access that uses a URL including the first domain as a domain name is received from a client via the relay system, and a request for an API is thus received from the client. The backend generates a relay Cookie including the relay backend domain as a domain used for establishing the session. The frontend transmits the relay Cookie to the client via the relay system.

2 Claims, 7 Drawing Sheets

FIG.2A

DOMAIN OF FRONTEND

| NORMAL DOMAIN | ○○○.com |
|---|---|
| API DOMAIN | △△△.○○○.com |

FIG.2B

DOMAIN OF BACKEND

| NORMAL DOMAIN | ○○○.com |
|---|---|
| RELAY DOMAIN | △△△.com |

FIG.2C

DOMAIN OF RELAY SYSTEM

| RELAY DOMAIN | △△△.com |
|---|---|

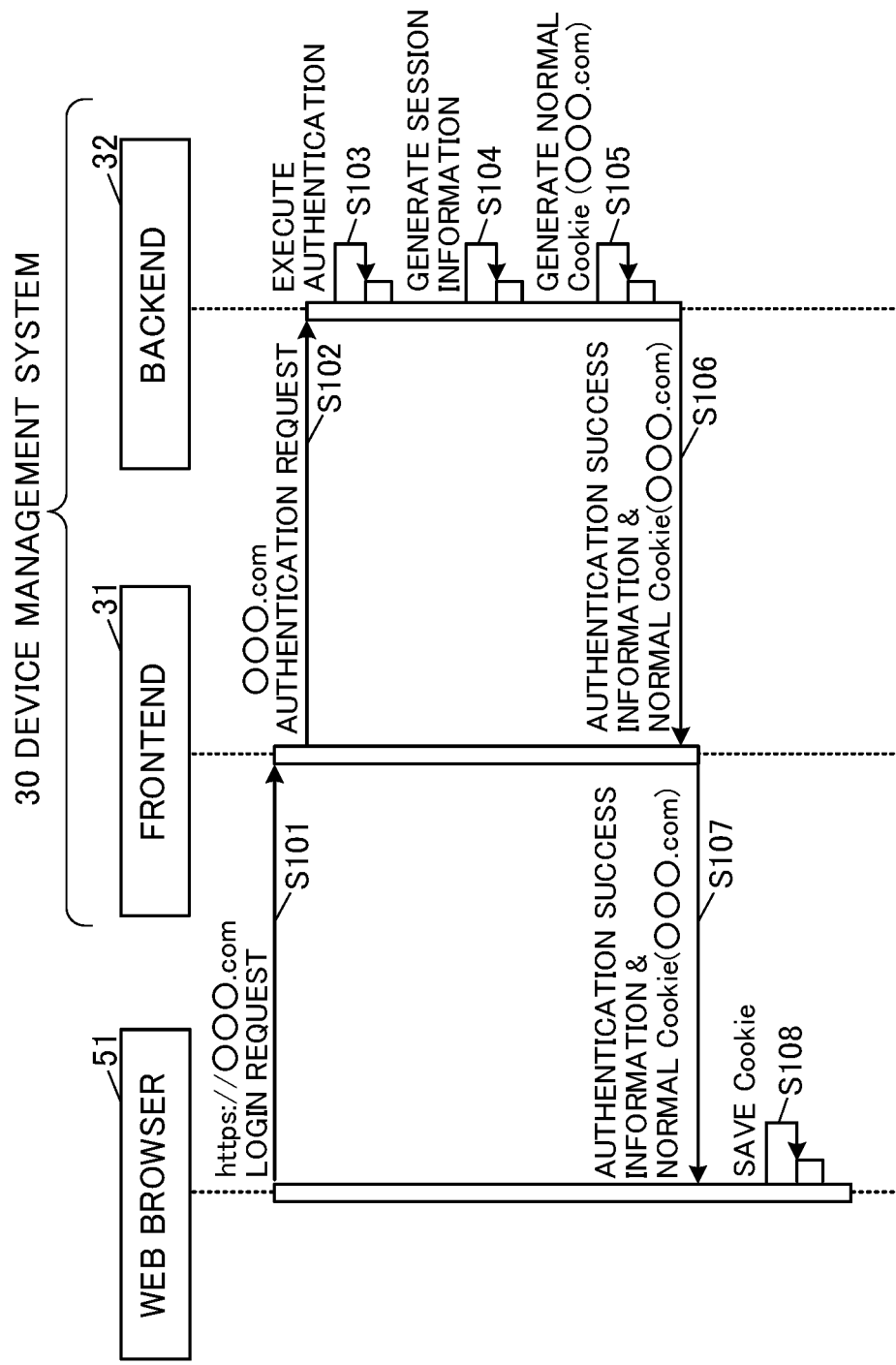

FIG.4
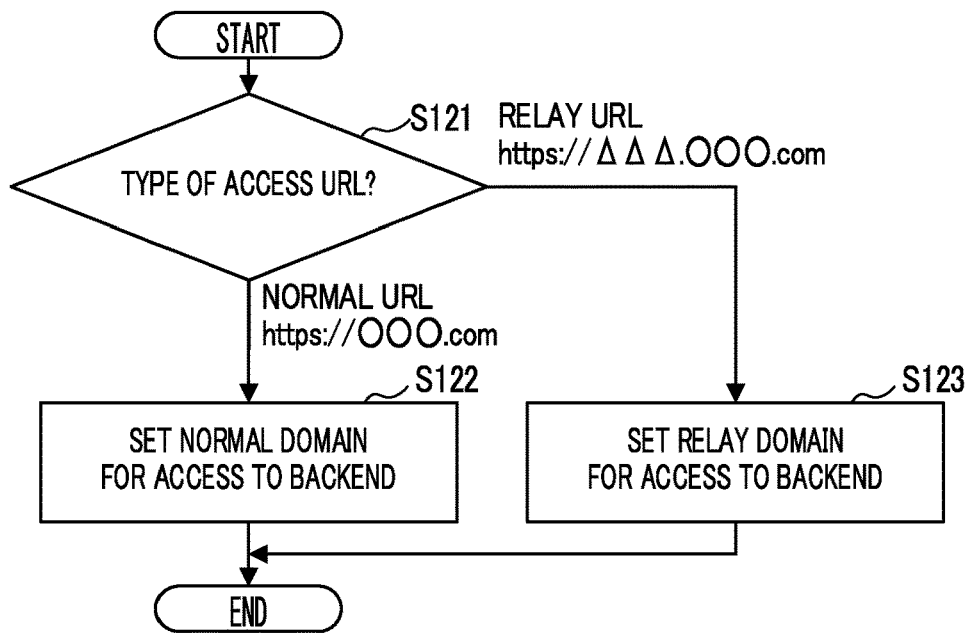
FIG.5
NORMAL Cookie
Session Id = 123456
Domain = ○○○.com
Path = /
Expires = 2022/09/01 T00:00:00
FIG.6
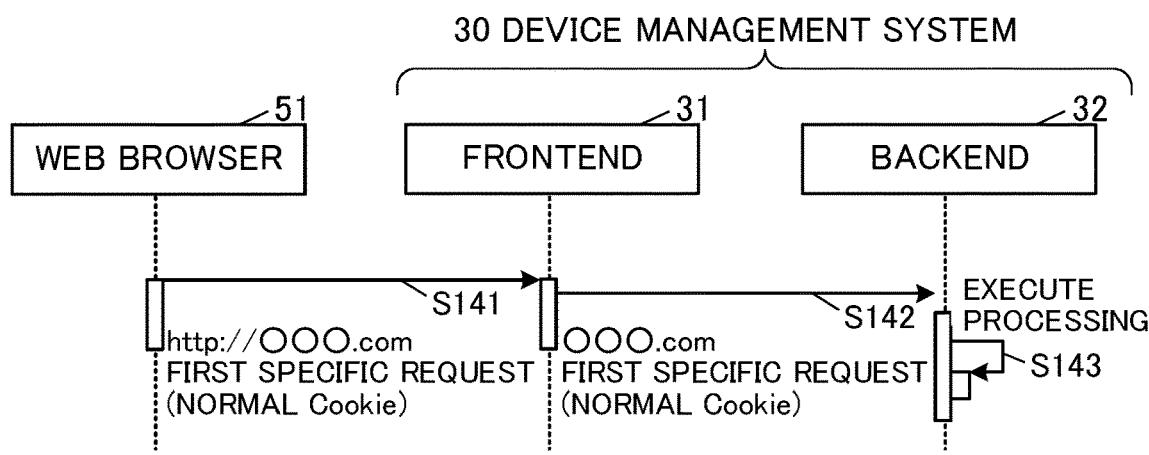

FIG.8

RELAY Cookie

| Session Id = 654321 |
| Domain = △△△.com |
| Path = / |
| Expires = 2022/09/01 T00:00:00 |

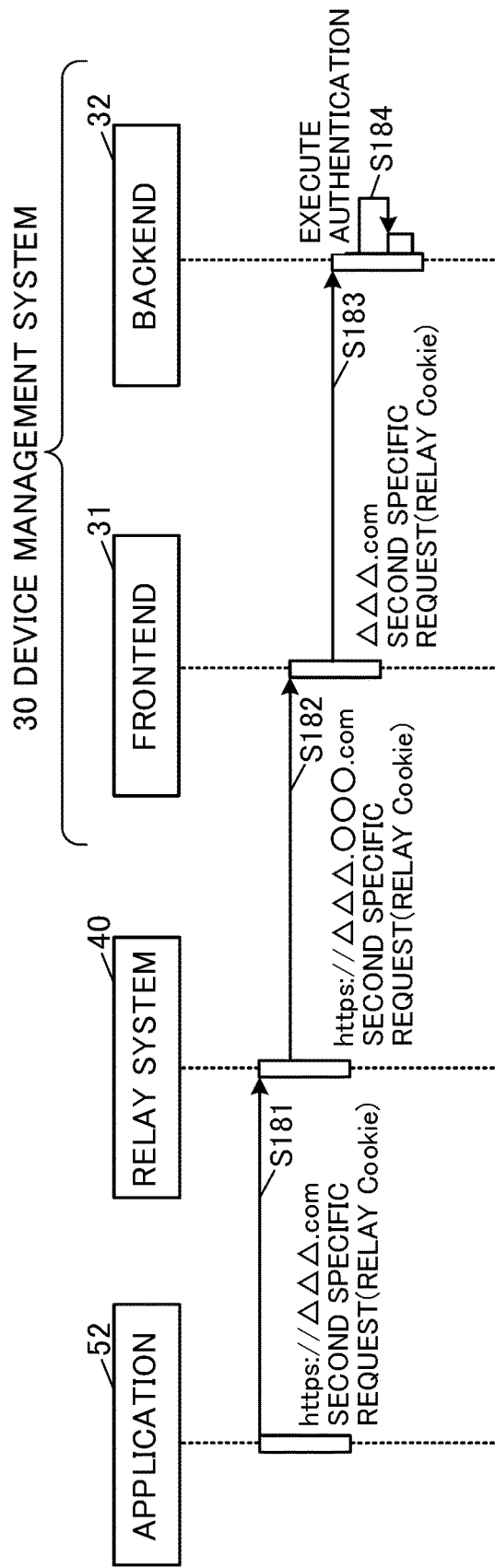

DEVICE MANAGEMENT SYSTEM

INCORPORATION BY REFERENCE

This application is based upon and claims the benefit of priority from the corresponding Japanese Patent Application No. 2022-149014 filed on Sep. 20, 2022, the entire contents of which are incorporated herein by reference.

BACKGROUND

The present disclosure relates to a device management system which manages a device.

Conventionally, a device management system which manages a device has been known.

SUMMARY

A device management system according to the present disclosure is a system which manages a device. The device management system includes a backend and a frontend. The backend generates a Cookie used for establishing a session between a client outside the device management system and the device management system. The frontend provides an API used by the client via a relay system. The frontend includes a first domain that is used when the frontend is accessed from the client via the relay system. The backend includes a domain of the relay system as a relay backend domain that is a domain of the backend. The frontend accesses the relay backend domain when an access that uses a first URL including the first domain as a domain name is received from the client via the relay system, and a request for the API is thus received from the client. The backend generates a relay Cookie which is the Cookie including the relay backend domain accessed by the frontend as a domain used for establishing the session. The frontend transmits, when the relay Cookie is generated by the backend, the relay Cookie to the client via the relay system.

The frontend may include a second domain that is used when the frontend is accessed from the client without using the relay system. The backend may include the second domain as a normal backend domain that is the domain of the backend. In this case, the frontend accesses the normal backend domain when an access that uses a second URL including the second domain as a domain name is received from the client without using the relay system, and a request for the API is thus received from the client. The backend generates a normal Cookie which is the Cookie including the normal backend domain accessed by the frontend as the domain used for establishing the session. The frontend transmits, when the normal Cookie is generated by the backend, the normal Cookie to the client without using the relay system.

This Summary is provided to introduce a selection of concepts in a simplified form that are further described below in the Detailed Description with reference where appropriate to the accompanying drawings. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

BRIEF DESCRIPTION OF THE DRAWINGS

FIG. 2A is a diagram showing an example of a domain of a frontend shown in FIG. 1;

FIG. 2B is a diagram showing an example of a domain of a backend shown in FIG. 1;

FIG. 2C is a diagram showing an example of a domain of a relay system shown in FIG. 1;

FIG. 3 is a an operational sequence diagram of the computing system when an access from a web browser to a device management system is made in a case where an HTTP (Hypertext Transfer Protocol) session is not established between the web browser and the device management system;

FIG. 4 is a flowchart showing operations of the frontend when the frontend sets a domain of the backend that is used for transmitting a request to the backend;

FIG. 5 is a diagram showing an example of a normal Cookie that is generated when the web browser accesses the device management system;

FIG. 6 is an operational sequence diagram of the computing system when an access from the web browser to the device management system is made in a case where an HTTP session is established between the web browser and the device management system;

FIG. 8 is a diagram showing an example of a relay Cookie that is generated when the application accesses the device management system via the relay system; and FIG. 9 is an operational sequence diagram of the computing system when an access from the application to the device management system is made in a case where an HTTP session is established between the application and the device management system.

DETAILED DESCRIPTION

Hereinafter, an embodiment of the present disclosure will be described with reference to the drawings.

First, a configuration of a computing system 10 according to one embodiment of the present disclosure will be described.

Figure 1:
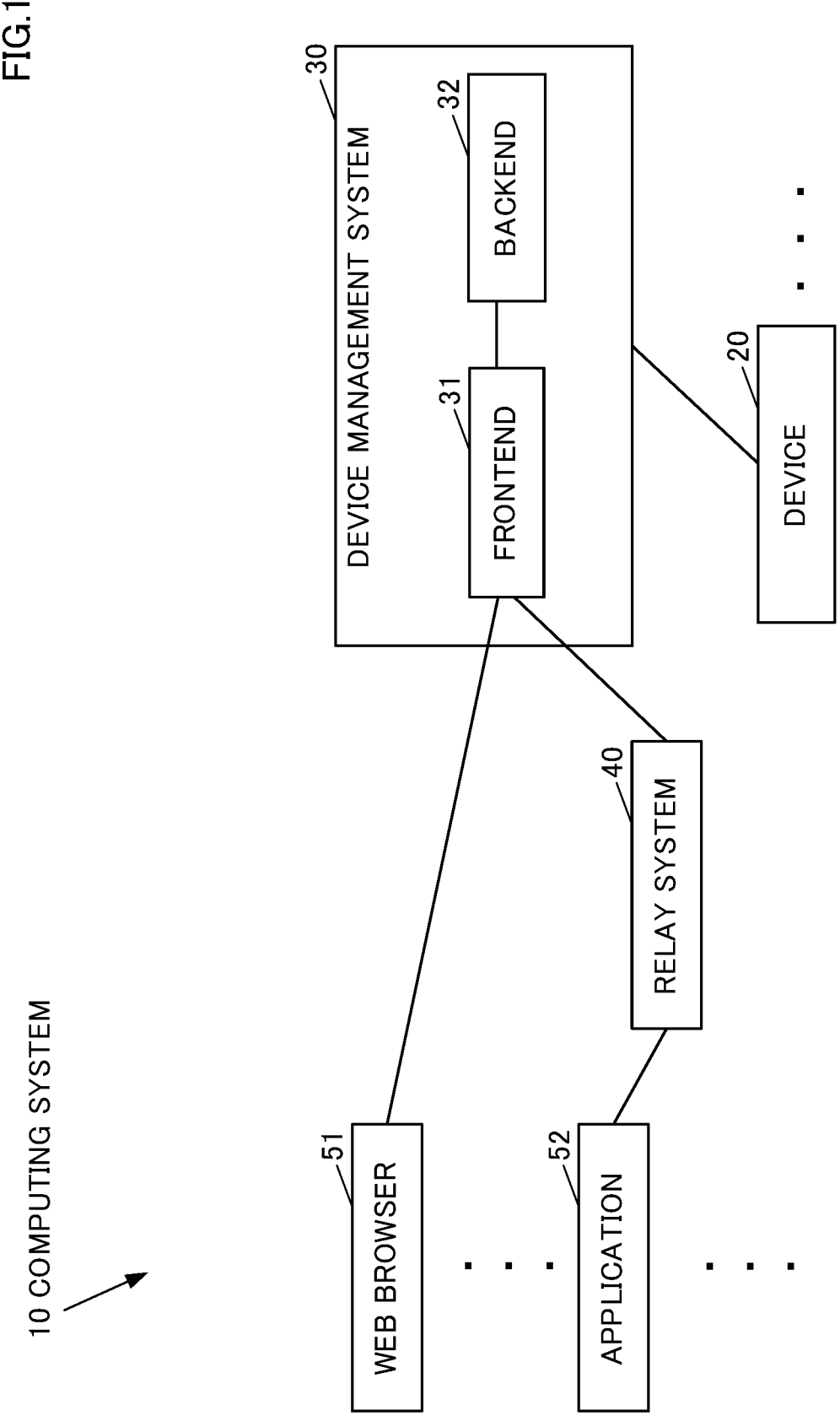
FIG. 1 is a block diagram of a computing system according to an embodiment of the present disclosure.

FIG. 1 is a block diagram showing the computing system 10 according to the present embodiment.

As shown in FIG. 1, the computing system 10 according to the present embodiment includes at least one device 20. The device 20 is, for example, an image forming apparatus such as an MFP (Multifunction Peripheral) and a printer.

In the computing system 10, the device 20 is connected to a network such as a LAN (Local Area Network) that is managed by an end user of the device 20.

The computing system 10 includes a device management system 30 which remotely manages the device 20. The device management system 30 can be used by, for example, users such as a sales company, a sales outlet, and an end user of the device 20.

The device management system 30 is a system for executing, for example, processing of providing various types of information of the device 20 to the user or various types of setting processing with respect to the device 20. The various types of setting processing include an update of firmware of the device 20, and the like.

The device management system 30 is realized by a computer executing programs. The device management system 30 is realized by at least one computer. The device management system 30 is realized by, for example, cloud computing such as Microsoft Azure (registered trademark).

The device management system 30 includes a frontend 31 and a backend 32. A request from an external client to the device management system 30 reaches the backend 32 via the frontend 31 to be processed by the backend 32. The external client is a client outside the device management system 30.

The frontend 31 provides an external linkage API (Application Program Interface). The external linkage API is an API used from outside the device management system 30. Various external linkage APIs can be used in the frontend 31.

For example, the external linkage API includes an API used when the external client operates the device management system 30. The external linkage API may also include an API used when the external client acquires information from the device management system 30.

Specifically, the external linkage API may include an API for GetDeviceInfo which is a request for acquiring information of a device managed by the device management system 30.

In addition, the external linkage API includes an API for a login request which is a request for logging in to the device management system 30.

Of the external linkage APIs, a normal API other than the login request API can only be used by the external client that has a session established with the device management system 30. On the other hand, the login request API can also be used by the external client not having a session established with the device management system 30.

The computing system 10 includes a relay system 40. The relay system 40 relays messages exchanged between the external client and the frontend 31.

For example, the relay system 40 can convert a request message transmitted from the external client into a form for the external linkage API of the frontend 31, and transmit it to the external linkage API of the frontend 31. Further, the relay system 40 can also convert a response message from the device management system 30 into a form for the external client, and transmit it to the external client.

The form of a message to be converted by the relay system 40 is, for example, a message protocol, a message format, or the like.

The relay system 40 can be realized by, for example, an enterprise service bus such as IBM (registered trademark) Integration Bus. The relay system 40 is realized by at least one computer. The external linkage API of the frontend 31 is publicly available via the relay system 40.

The computing system 10 includes at least one web browser 51 as the external client. The web browser 51 is realized by, for example, a computer such as a PC (Personal Computer) (not shown). The user can access the device management system 30 from the web browser 51 without using the relay system 40.

The computing system 10 includes one or more applications 52 as the external client other than the web browser 51. The application 52 is realized by, for example, a computer such as a PC (not shown).

The user can access the device management system 30 from the application 52 via the relay system 40. The application 52 executes, for example, processing of automating a specific series of operations with respect to the device management system 30. The specific series of operations are operations executable by the web browser 51.

The specific series of operations include, for example, an operation of creating a group of users of a specific device 20 managed by the device management system 30, an operation of adding a user of the device 20 to the created group, and the like.

FIG. 2A is a diagram showing an example of a domain of the frontend 31. FIG. 2B is a diagram showing an example of a domain of the backend 32. FIG. 2C is a diagram showing an example of a domain of the relay system 40.

The frontend 31 is accessed from the web browser 51 without using the relay system 40. On the other hand, the frontend 31 is accessed from the application 52 via the relay system 40.

As shown in FIG. 2A, the frontend 31 includes a normal domain and an API domain. The normal domain is a domain of the device management system 30 that is used when the web browser 51 accesses the device management system 30 without using the relay system 40. The API domain is a domain of the device management system 30 that is used when the relay system 40 accesses the device management system 30. The API domain is used for accessing the external linkage API.

The API domain is an example of a first domain that is used when the frontend 31 is accessed from the external client via the relay system 40. The normal domain is an example of a second domain that is used when the frontend 31 is accessed from the external client without using the relay system 40.

As shown in FIG. 2B, the backend 32 includes the normal domain shared with the device management system 30 and a relay domain to be described later, each as a domain of the backend 32. The relay domain of the backend 32 is an example of a relay backend domain. The normal domain of the backend 32 is an example of a normal backend domain.

As shown in FIG. 2C, the relay system 40 includes the relay domain shared with the backend 32 as a domain of the relay system 40. The relay domain is used when the application 52 accesses the relay system 40. The relay system 40 accesses the device management system 30 using the API domain.

Next, operations of the computing system 10 will be described.

First, operations of the computing system 10 in a case where an access is made from the web browser 51 to the device management system 30 will be described.

First, operations of the computing system 10 when performing a first direct access will be described. The first direct access is an access from the web browser 51 to the device management system 30 in a case where an HTTP session is not established between the web browser 51 and the device management system 30.

FIG. 3 is an operational sequence diagram of the computing system 10 when performing the first direct access.

In descriptions below, Uniform Resource Locator will be abbreviated to URL. Further, a URL including the normal domain as a domain name will be referred to as a normal URL. Furthermore, a URL including the relay domain as a domain name will be referred to as a relay URL. Moreover, a URL including the API domain as a domain name will be referred to as an API URL. The API URL is an example of a first URL. The normal URL is an example of a second URL.

As shown in FIG. 3, the web browser 51 executes processing of Step S101 upon receiving an instruction to access the device management system 30 from the user.

In Step S101, the web browser 51 accesses the device management system 30 using the normal URL, to thus transmit a login request to the frontend 31. The web browser 51 incorporates a combination of an ID and a password input by the user into the login request.

FIG. 4 is a flowchart showing operations of the frontend 31 when the frontend 31 sets a domain of the backend 32 that is used for transmitting a request to the backend 32.

When accessed from outside the device management system 30, the frontend 31 executes the operations shown in FIG. 4.

As shown in FIG. 4, the frontend 31 determines a type of the URL used for accessing the device management system 30 from outside (S121).

When determining that the URL used for accessing the device management system 30 from outside is the normal URL, the frontend 31 sets the normal domain of the device management system 30 as a domain for a request transmission to the backend 32 (S122). After executing the processing of Step S122, the frontend 31 ends the operations shown in FIG. 4.

On the other hand, when determining that the URL used for accessing the device management system 30 from outside is the API URL, the frontend 31 sets the relay domain of the device management system 30 as the domain for a request transmission to the backend 32 (S123). After executing the processing of Step S123, the frontend 31 ends the operations shown in FIG. 4.

As shown in FIG. 3, the frontend 31 receives the login request transmitted from the web browser 51 in Step S101 (S102). In this case, the login request is an access that uses the normal URL. Therefore, the frontend 31 accesses the normal domain set in Step S122 of FIG. 4, to thus transmit an authentication request corresponding to the login request to the backend 32 (S102). The login request is an example of a request for the API. The frontend 31 incorporates the combination of the ID and password incorporated into the login request in Step S101 into the authentication request to be transmitted in Step S102.

Upon receiving the authentication request transmitted from the frontend 31 in Step S102, the backend 32 executes authentication processing in response to the authentication request (S103).

When the combination of the ID and password included in the authentication request is included in registration authentication information managed in advance by the device management system 30, the backend 32 determines that the authentication processing of Step S103 has succeeded.

On the other hand, when the combination of the ID and password included in the authentication request is not included in the registration authentication information, the backend 32 determines that the authentication processing of Step S103 has failed. In descriptions below, descriptions on a case where the authentication processing of Step S103 has failed are omitted.

Upon determining that the authentication processing has succeeded, the backend 32 generates session information used for establishing a session to be used this time (S104).

Upon ending the processing of Step S104, the backend 32 generates a normal Cookie (S105). As shown in FIG. 5, the normal Cookie is a Cookie including a session ID for identifying the session information generated in Step S104. In addition, the normal Cookie includes the normal domain used in Step S102 as the domain used for establishing the session.

FIG. 5 is a diagram showing an example of the normal Cookie that is generated when the web browser 51 accesses the device management system 30.

In the example shown in FIG. 5, the normal Cookie includes an attribute name and attribute value for each of a plurality of attributes including SessionId, Domain, Path, and Expires. Specifically, in the example shown in FIG. 5, "123456" represents the session ID, a domain and subdomain designated by "Domain=" represent a domain range where the normal Cookie can be used, "l" represents a range of a path where the normal Cookie can be used, and "2022/09/01T00:00:00" represents an expiration date of the normal Cookie.

As shown in FIG. 3, upon ending the processing of Step S105, the backend 32 transmits authentication success information indicating a success of the authentication processing and the normal Cookie generated in Step S105 to the frontend 31 (S106).

Upon receiving the authentication success information and the normal Cookie transmitted from the backend 32 in Step S106, the frontend 31 transmits the authentication success information and the normal Cookie to the web browser 51 (S107).

The web browser 51 receives the authentication success information and the normal Cookie transmitted from the frontend 31 in Step S107 (S108). Here, the domain of the frontend 31 as a transmission source of the normal Cookie in Step S107 falls within a domain range of the Cookie received in Step S108. Therefore, the web browser 51 saves the normal Cookie received in Step S108 without discarding it (S108).

It is noted that when the domain of the frontend 31 as the transmission source of the normal Cookie in Step S107 does not fall within the domain range of the Cookie received in Step S107, the web browser 51 discards the Cookie received in Step S108 without saving it.

In the manner described above, an HTTP session is established between the web browser 51 and the device management system 30. At this time, the domain included in the Cookie is used for establishing the session.

Next, operations of the computing system 10 when performing a second direct access will be described. The second direct access is an access from the web browser 51 to the device management system 30 in a case where an HTTP session is established between the web browser 51 and the device management system 30.

FIG. 6 is an operational sequence diagram of the computing system 10 when performing the second direct access.

As shown in FIG. 6, the web browser 51 accesses the normal URL "https://ooo.com", to thus transmit a first specific request to the frontend 31 of the device management system 30 (S141). The first specific request is an example of a request for the external linkage API. The web browser 51 attaches the normal Cookie saved in Step S108 to an HTTP header of the first specific request.

The frontend 31 receives the first specific request (S142). In this case, an access destination of the first specific request is the normal URL. Therefore, the frontend 31 accesses the normal domain of the backend 32 set in Step S122 of FIG. 4, to thus transmit the first specific request to the backend 32 (S142). The frontend 31 attaches the normal Cookie that has been attached to the HTTP header of the first specific request received from the web browser 51 to an HTTP header of the first specific request to be transmitted in Step S142.

Upon receiving the first specific request transmitted from the frontend 31 in Step S142, the backend 32 executes processing corresponding to the first specific request (S143). Of the session information saved in the device management system 30, the backend 32 uses session information specified by the session ID included in the normal Cookie attached to the HTTP header of the first specific request, in the processing of Step S143.

Descriptions on processing after the processing of Step S143 are omitted.

Next, operations of the computing system 10 when an access is made from the application 52 to the device management system 30 will be described.

First, operations of the computing system 10 when performing a first relay access will be described. The first relay access is an access from the application 52 to the device management system 30 in a case where an HTTP session is not established between the application 52 and the device management system 30.

Figure 7:
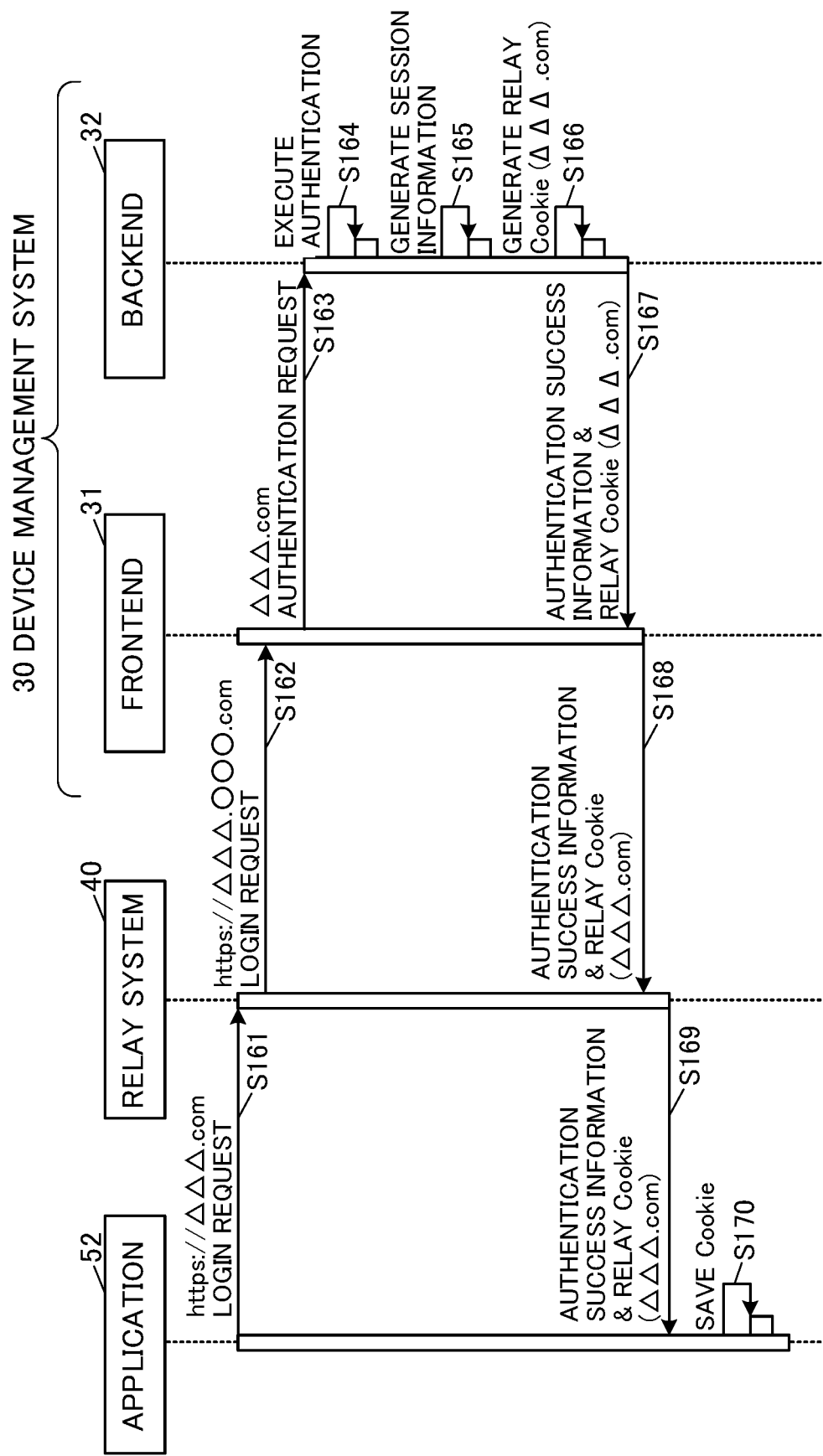
FIG. 7 is an operational sequence diagram of the computing system when an access from an application to the device management system is made in a case where an HTTP session is not established between the application and the device management system.

FIG. 7 is an operational sequence diagram of the computing system 10 when performing the first relay access.

For example, the application 52 executes processing of Step S161 upon receiving an instruction to execute the application 52 from the user.

As shown in FIG. 7, the application 52 accesses the relay URL to thus transmit a login request to the relay system 40 (S161). The application 52 incorporates a combination of an ID and a password registered in advance in the application 52 into the login request of Step S161.

Upon receiving the login request transmitted from the application 52 in Step S161, the relay system 40 accesses the API URL to thus transmit the login request to the frontend 31 of the device management system 30 (S162).

The frontend 31 receives the login request transmitted from the relay system 40 in Step S162 (S163). In this case, the login request is an access that uses the API URL. Therefore, the frontend 31 accesses the relay domain set in Step S123 of FIG. 4, to thus transmit an authentication request corresponding to the login request to the backend 32 (S163). The frontend 31 incorporates the combination of the ID and password included in the login request of Step S162 into the authentication request to be transmitted in Step S163.

Upon receiving the authentication request transmitted from the frontend 31 in Step S163, the backend 32 executes the authentication processing in response to the authentication request (S164).

When the combination of the ID and password included in the authentication request transmitted from the frontend 31 in Step S163 is included in registration authentication information, the backend 32 determines that the authentication processing of Step S164 has succeeded.

On the other hand, when the combination of the ID and password included in the authentication request is not included in the registration authentication information, the backend 32 determines that the authentication processing of Step S164 has failed. In descriptions below, descriptions on a case where the authentication processing of Step S164 has failed are omitted.

Upon determining that the authentication processing of Step S164 has succeeded, the backend 32 generates session information used for establishing a session to be used this time (S165).

Upon ending the processing of Step S165, the backend 32 generates a relay Cookie (S166). As shown in FIG. 8, the relay Cookie is a Cookie including a session ID for identifying the session information generated in Step S165. In addition, the relay Cookie includes the relay domain used in Step S163 as the domain used for establishing the session.

FIG. 8 is a diagram showing an example of the relay Cookie that is generated when the application 52 accesses the device management system 30 via the relay system 40.

The relay Cookie shown in FIG. 8 includes an attribute name and attribute value for each of a plurality of attributes including SessionId, Domain, Path, and Expires. Specifically, in the example shown in FIG. 8, "654321" represents the session ID, a domain and subdomain designated by "Domain=" represent a domain range where the relay Cookie can be used, "I" represents a range of a path where the relay Cookie can be used, and "2022/09/01T00:00:00" represents an expiration date of the relay Cookie.

As shown in FIG. 7, upon ending the processing of Step S166, the backend 32 transmits the authentication success information and the relay Cookie generated in Step S166 to the frontend 31 (S167).

Upon receiving the authentication success information and the relay Cookie from the backend 32, the frontend 31 transmits the authentication success information and the relay Cookie to the relay system 40 (S168).

Upon receiving the authentication success information and the relay Cookie from the frontend 31, the relay system 40 transmits the authentication success information and the relay Cookie to the application 52 (S169).

The application 52 receives the authentication success information and the relay Cookie from the relay system 40 (S170). Here, the domain of the relay system 40 as a transmission source of the relay Cookie in Step S169 falls within a domain range of the Cookie received in Step S170. Therefore, the application 52 saves the relay Cookie received in Step S170 without discarding it (S170).

It is noted that when the domain of the relay system 40 as the transmission source of the relay Cookie in Step S169 does not fall within the domain range of the Cookie received in Step S170, the application 52 discards the Cookie received in Step S170 without saving it.

In the manner described above, an HTTP session is established between the application 52 and the device management system 30. The application 52 can use the external linkage API other than the login request API within the session established between the application 52 and the device management system 30.

Next, operations of the computing system 10 when performing a second relay access will be described. The second relay access is an access from the application 52 to the device management system 30 in a case where an HTTP session is established between the application 52 and the device management system 30.

FIG. 9 is an operational sequence diagram of the computing system 10 when performing the second relay access.

As shown in FIG. 9, the application 52 accesses the relay URL to thus transmit a second specific request to the relay system 40 (S181). The second specific request is an example of the request for the external linkage API. The application 52 attaches the relay Cookie saved in Step S170 to an HTTP header of the second specific request.

Upon receiving the second specific request transmitted from the application 52 in Step S181, the relay system 40 accesses the API URL to thus transmit the second specific request to the frontend 31 of the device management system 30 (S182). The relay system 40 attaches the relay Cookie that has been attached to the HTTP header of the second specific request received from the application 52 to an HTTP header of the second specific request to be transmitted in Step S182.

The frontend 31 receives the second specific request transmitted from the relay system 40 (S183). In this case, the second specific request is an access that uses the API URL. Therefore, the frontend 31 accesses the relay domain set in Step S123 of FIG. 4, to thus transmit the second specific request to the backend 32 (S183). The frontend 31 attaches the relay Cookie that has been attached to the HTTP header of the second specific request of Step S182 to an HTTP header of the second specific request to be transmitted in Step S183.

Upon receiving the second specific request transmitted from the frontend 31 in Step S183, the backend 32 executes processing corresponding to the second specific request (S184).

Of the session information saved in the device management system 30, the backend 32 uses session information specified by the session ID included in the relay Cookie attached to the HTTP header of the second specific request, in the processing of Step S184.

Descriptions on processing after the processing of Step S184 are omitted.

As described above, the frontend 31 may receive the API request from the application 52 by receiving an access that uses the API URL from the application 52 via the relay system 40 (S161 to S162). In this case, the frontend 31 accesses the relay domain of the backend 32 (S163).

The backend 32 generates the relay Cookie that includes the relay domain of the backend 32 accessed by the frontend 31 as the domain used for establishing the session (S166).

When the relay Cookie is generated by the backend 32, the frontend 31 transmits the relay Cookie to the application 52 via the relay system 40 (S168 to S169).

Therefore, discard of the Cookie by the application 52 due to a fact that the domain range included in the relay Cookie transmitted to the application 52 via the relay system 40 does not include the domain of the relay system 40 is prevented from occurring. As a result, even when the device management system 30 is accessed from the application 52 via the relay system 40, a session can be established between the device management system 30 and the application 52.

Meanwhile, the frontend 31 also includes the normal domain that is used when the frontend 31 is accessed from the web browser 51 without using the relay system 40 (see FIG. 2A). The backend 32 includes the normal domain as the domain of the backend 32 (see FIG. 2B).

The frontend 31 may receive the API request from the web browser 51 by receiving an access that uses the normal URL from the web browser 51 without using the relay system 40 (S101). In this case, the frontend 31 accesses the normal domain of the backend 32 (S102).

Further, the backend 32 generates the normal Cookie that includes the normal domain of the backend 32 accessed by the frontend 31 as the domain used for establishing the session (S105).

When the normal Cookie is generated by the backend 32, the frontend 31 transmits the normal Cookie to the web browser 51 without using the relay system 40 (S107).

FIG. 7 shows an example of the case where the device management system 30 is accessed from the application 52 as the client via the relay system 40. On the other hand, FIG. 3 shows an example of the case where the device management system 30 is accessed from the web browser 51 as the client without using the relay system 40. Also in the example shown in FIG. 3, the device management system 30 can establish a session with the client.

It is to be understood that the embodiments herein are illustrative and not restrictive, since the scope of the disclosure is defined by the appended claims rather than by the description preceding them, and all changes that fall within metes and bounds of the claims, or equivalence of such metes and bounds thereof are therefore intended to be embraced by the claims.

The invention claimed is:

1. A device management system implemented by at least one computer to manage a device, comprising:
   a backend which generates a Cookie used for establishing a session between a client outside the device management system and the device management system; and
   a frontend which provides an API used by the client via a relay system, wherein
   the frontend includes a first domain that is used when the frontend is accessed from the client via the relay system,
   the backend includes a domain of the relay system as a relay backend domain that is a domain of the backend,
   the frontend accesses the relay backend domain when an access that uses a first URL including the first domain as a domain name is received from the client via the relay system, and a request for the API is thus received from the client,
   the backend generates a relay Cookie which is the Cookie including the relay backend domain accessed by the frontend as a domain used for establishing the session, and
   the frontend transmits, when the relay Cookie is generated by the backend, the relay Cookie to the client via the relay system.

2. The device management system according to claim 1, wherein
   the frontend includes a second domain that is used when the frontend is accessed from the client without using the relay system,
   the backend includes the second domain as a normal backend domain that is the domain of the backend,
   the frontend accesses the normal backend domain when an access that uses a second URL including the second domain as a domain name is received from the client without using the relay system, and a request for the API is thus received from the client,
   the backend generates a normal Cookie which is the Cookie including the normal backend domain accessed by the frontend as the domain used for establishing the session, and
   the frontend transmits, when the normal Cookie is generated by the backend, the normal Cookie to the client without using the relay system.

* * * * *